United States Patent
Yamamoto et al.

(10) Patent No.: US 7,378,812 B2
(45) Date of Patent: May 27, 2008

(54) LEGGED ROBOT AND LEGGED ROBOT WALKING CONTROL METHOD

(75) Inventors: Takashi Yamamoto, Seto (JP); Hisayoshi Sugihara, Aichi-ken (JP); Keisuke Suga, Toyota (JP); Yuji Tsusaka, Nagoya (JP); Ryosuke Tajima, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 10/587,544

(22) PCT Filed: Jan. 26, 2005

(86) PCT No.: PCT/JP2005/001450
§ 371 (c)(1),
(2), (4) Date: May 30, 2007

(87) PCT Pub. No.: WO2005/072916
PCT Pub. Date: Aug. 11, 2005

(65) Prior Publication Data
US 2007/0241713 A1    Oct. 18, 2007

(30) Foreign Application Priority Data
Jan. 28, 2004    (JP)    ............................. 2004-020328

(51) Int. Cl.
*B25J 5/00*    (2006.01)
(52) U.S. Cl. .............................. 318/568.12; 318/568.1; 318/568.11; 701/23; 73/65.07
(58) Field of Classification Search ........................ 318/560.1–560.12; 701/23; 700/245, 63; 702/42; 73/65.07
See application file for complete search history.

(56) References Cited
U.S. PATENT DOCUMENTS
5,841,258 A * 11/1998 Takenaka ................ 318/568.12

(Continued)

FOREIGN PATENT DOCUMENTS
JP    5-305579    11/1993

(Continued)

OTHER PUBLICATIONS
Japanese Office Action dated Aug. 7, 2007.

(Continued)

*Primary Examiner*—Paul Ip
(74) *Attorney, Agent, or Firm*—Finnegan, Henderson, Farabow, Garrett & Dunner, LLP

(57) ABSTRACT

A legged robot and a legged robot walking control method are disclosed, which enable stable walking without force sensors on leg tips. A legged robot of the present invention comprises a torso, a leg link, which is swingably connected to the torso, storing means 210 for storing leg tip gait data describing a time-series change in a target leg tip motion, storing means 210 for storing torso gait data describing a time-series change in a target torso motion, which realizes a target ZMP following the change in the target leg tip motion, torso motion detection means 218, 220 for detecting an actual torso motion, deviation calculation means 312 for calculating a deviation of the actual torso motion from the target torso motion, correction quantity calculation means 308 for determining a correction quantity from the calculated deviation based on a prescribed transfer function, and correction means 306 for correcting the target torso gait data based on the determined correction quantity.

11 Claims, 10 Drawing Sheets

U.S. PATENT DOCUMENTS

| | | | |
|---|---|---|---|
| 6,064,167 A * | 5/2000 | Takenaka et al. | 318/568.12 |
| 6,144,385 A * | 11/2000 | Girard | 345/424 |
| 6,697,709 B2 * | 2/2004 | Kuroki et al. | 700/245 |
| 6,789,338 B2 * | 9/2004 | Sano et al. | 318/568.12 |
| 6,901,313 B2 * | 5/2005 | Mori et al. | 700/245 |
| 7,017,395 B2 * | 3/2006 | Kawai et al. | 73/65.07 |
| 7,054,763 B2 * | 5/2006 | Kawai et al. | 702/42 |
| 7,076,337 B2 * | 7/2006 | Kuroki et al. | 700/254 |
| 7,113,849 B2 * | 9/2006 | Kuroki et al. | 700/245 |
| 7,190,141 B1 * | 3/2007 | Ashrafiuon et al. | 318/568.12 |
| 2002/0183897 A1 * | 12/2002 | Kuroki et al. | 700/245 |
| 2003/0144763 A1 * | 7/2003 | Mori et al. | 700/245 |
| 2004/0056625 A1 * | 3/2004 | Sano et al. | 318/568.12 |
| 2004/0143369 A1 | 7/2004 | Takenaka et al. | |
| 2004/0206164 A1 * | 10/2004 | Kawai et al. | 73/65.07 |
| 2005/0021180 A1 * | 1/2005 | Kwon et al. | 700/245 |
| 2006/0122731 A1 | 6/2006 | Takenaka et al. | |

FOREIGN PATENT DOCUMENTS

| | | |
|---|---|---|
| JP | 10-230485 | 9/1998 |
| JP | 2002-326173 | 11/2002 |
| JP | 2004-181613 | 7/2004 |
| JP | 2005-212012 | 8/2005 |

OTHER PUBLICATIONS

K. Nagasaka et al., "Stabilization of Dynamic Walk on a Humanoid Using Torso Position Compliance Control," *17th Conference of Robotics Soc. Jap.*, Japan Robotics Society, Sep. 9, 1999, pp. 1193-94.

K. Satoshi, "Design and Implementation of Remotely Operation Interface for Humanoid Robot," *Proc. 2001 IEEE Intl. Conf*, Conference on Robotics & Automation, Seoul Korea, May 21-26, 2001, pp. 401-406.

* cited by examiner $F = M \cdot a$      (1)
$F_o = M \cdot a_o$      (2)
$F_r = M \cdot a_r$      (3)
$D_r = F_r - F_o = M(a_r - a_o)$      (4)
$D_r = (M_i \cdot s^2 + C_i \cdot s + K_i) \cdot x_d = G(s) \cdot x_d$      (5)
$x_d = \dfrac{1}{G(s)} D_r$      (6)

LEGGED ROBOT AND LEGGED ROBOT WALKING CONTROL METHOD

CROSS-REFERENCE TO RELATED APPLICATIONS

The present application claims priority based on Japanese Patent Application No. 2004-20328, filed on Jan. 28, 2004, the entire disclosure of which is incorporated herein by reference.

TECHNICAL FIELD

The present invention relates to technology for controlling a machine (legged robot mechanical system), to which leg links are swingably connected to a torso (trunk part), to make it walk. More specifically, the present invention relates to a legged robot and a walking control method thereof, enabling continuous stable walking even when the legged robot is affected by an unanticipated disturbance force.

BACKGROUND ART

Legged robots are being developed that walk by changing the relative postures among the left leg link, the torso, and the right leg link.

Data that instructs the movement of the left leg tip, the torso and the right leg tip is required to make a legged robot walk. Of these, the position of the torso must be a suitable value relative to the positions of leg tips, and when this value is not suitable, the robot falls down.

In order to obtain a torso position that will not cause a legged robot to fall down, complicated calculations that take into account the robot's dynamics are needed. This calculation process is summarized below.

(1) Specify time-series data for instructing the positions of the left leg tip and right leg tip of the robot.

(2) Specify a position wherein a ZMP of the robot must be located, taking into account the positions of the leg tips. ZMP (Zero Moment Point) refers to the point on the ground with respect to which the moment of the resultant force of the gravitational force, ground reaction force and inertial force acting on a robot constitutes zero. If the ZMP is within the area where the sole of the leg tip comes into flat contact with the ground, the robot will not topple over. Vice versa, to prevent the robot from falling down, the ZMP must be within the area where the sole of the leg tip comes into flat contact with the ground. Accordingly, set a target ZMP that will satisfy the following relationship, taking into account the position of the leg tip that is making contact with the ground. That is, set the ZMP such that while the one leg link (for example, the left leg link) is off the ground, the target ZMP exists within the area of the sole of the leg tip making contact with the ground (right leg tip), and when this one leg link (left leg link) makes contact with the ground, constituting a state wherein both leg links are in contact with the ground, the ZMP begins to shift to within the area where the sole of the leg tip of the newly grounded leg link (left leg link), and completely shifts to within the area where the sole of the leg tip of the newly grounded leg link (left leg link) before the leg link that had been in contact with the ground up until this point (right leg link) is lifted off the ground. A ZMP, which is set like this, will be called the target ZMP. If the actual ZMP shifts in accordance with the target ZMP, the robot will continue walking without falling down.

(3) When a target ZMP, which changes in association with the changes of positions of the leg tips, is to be specified, calculate the dynamics of the robot by hypothesizing a time-series change in the torso position. Since the leg tip trajectory is specified when calculations are made, the posture of the robot will be determined once the torso position is hypothesized. When the posture of the robot is determined, it becomes possible to calculate the position of the ZMP for this posture. In order to calculate the ZMP position, the affects of the inertial force acting on the robot, as well as static factors, must be taken into consideration. By including the hypothesized time-series change in the torso position into the calculation, it becomes possible to calculate the location of a ZMP that takes into account the dynamics of the robot. Since the position of the ZMP can be calculated by hypothesizing a time-series change in the torso position (torso trajectory), it is possible to seek a torso trajectory (a time-series change in the torso position) that realizes a ZMP that coincides with the target ZMP.

Data indicating a time-series change in a torso position sought as described above is called torso gait data, data indicating a time-series change in an originally specified leg tip position is called leg tip gait data, and the general term given to both is called gait data. If a robot walks in accordance with gait data, the actual ZMP will coincide with the target ZMP, and the robot will be able to continue walking without falling down.

Gait data is provided as changes in position relative to time. Since position, velocity and acceleration are related to each other and one of these quantities can be calculated from another of these quantities, the gait date may be provided as changes in any of position, velocity or acceleration. In this specification, since gait data will be described in terms of any of position, velocity or acceleration, it will be called as data for describing motion.

A method for calculating torso motion, which causes a ZMP that coincides with a target ZMP, is a typical example of a method for calculating a time-series change in target torso motion that enables a robot to continue walking following changes in target leg tip motion, but it is not limited to this. Generally speaking, a legged robot comprises a torso, and a leg link, which are swingably connected to the torso, and when leg tip gait data describing a time-series change of a target leg tip motion is instructed, calculates torso gait data describing a time-series change of a target torso motion, which enables continuous walking following the change of the target leg tip motion, and uses the instructed leg tip gait data and calculated torso gait data to walk. The calculated torso gait data can also comprise data related to the tilt angle of the torso, in addition to data related to the torso position (If the tilt angle of the torso is set in advance in accordance with a prescribed pattern, it may not be necessary to calculate the tilt angle.) Data related to the position and the tilt angle of the torso can be the position and the angle themselves, or a rate of change thereof, or acceleration thereof.

An unanticipated disturbance force can act on a robot. An unanticipated disturbance force resulting from unexpected bumps on the ground can affect a robot, and an external force which pushes or pulls the robot can be applied to the robot from the outside. If a robot deviates from its gait data due to structural bending in the robot, backlash in the robot's joints, or the delayed response of the robot, the effect is the same as when an unanticipated disturbance acts on the robot.

When an unanticipated disturbance force acts on a robot, the robot will lose its balance. Accordingly, the walking control apparatus disclosed in Japanese Laid-open Patent Application No. 5-305579 is proposed.

In the walking control apparatus disclosed in Japanese Laid-open Patent Application No. 5-305579, the ZMP position is measured by measuring the ground reaction force or ground reaction moment, which act on the robot. The measured ZMP position is compared against the target ZMP position, and walking is stabilized by providing deviation of ZMP position as feedback to the posture and target positions of the soles of both leg tips.

DISCLOSURE OF INVENTION

In the walking control apparatus disclosed in Japanese Laid-open Patent Application No. 5-305579, the detection of a ground reaction force or ground reaction moment is imperative. In order to detect a ground reaction force or ground reaction moment, it is necessary to mount a 6-axis force sensor or other such high-performance force sensor in the proximity of the leg tips of the left and right legs.

A 6-axis force sensor or other such high-performance force sensor is expensive. Also, the leg tip is a member which is affected by the repeated impact of coming in contact with the ground pursuant to a robot walking. When a sensor is mounted on the proximity of the leg tip, the sensor is apt to malfunction as a result of impact. When a sensor mounted on the proximity of the leg tip malfunctions, the robot is not able to continue walking. Further, when a force sensor is mounted on the leg tip, numerous parts are needed to transmit a signal from the force sensor to the processing part. If any one of these parts malfunctions, the signal from the force sensor cannot be properly transmitted to the processing part, resulting in a state wherein the force sensor does not function.

Based on circumstances described above, technology, which does not need a force sensor mounted on the leg tip and is able to stabilize walking with simpler constitution, is deemed necessary to lower manufacturing costs and to enhancing the reliability of a legged robot.

The present invention is invented to resolve the above-mentioned problems of the prior art, and provides a legged robot and walking control method thereof, which enable stable, continuous walking without mounting a force sensor on the leg tip.

A legged robot embodied in the present invention comprises a torso, and a leg link swingably connected to the torso. In addition, the legged robot also comprises storing means for storing leg tip gait data describing a time-series change in a target leg tip motion, and storing means for storing torso gait data describing a time-series change in a target torso motion. The target torso motion is set in accordance with a relationship, which makes continuous walking possible by following the change in the target leg tip motion. For example, a torso motion that causes an actual ZMP to coincide with a target ZMP follows the change in the target leg tip motion.

The robot of the present invention further comprises torso motion detection means for detecting an actual torso motion, and deviation calculation means for calculating a deviation of the actual torso motion from the target torso motion. The robot further comprises correction means for determining a correction quantity from the calculated deviation based on a prescribed transfer function, and for correcting the torso gait data stored in the storing means for storing torso gait data based on the correction quantity.

It is also possible to conceive the present invention as a walking control method. In the walking control method of the present invention, there is implemented a step for storing leg tip gait data describing a time-series change in a target leg tip motion, and a step for storing torso gait data describing a time-series change in a target torso motion. A target torso motion is set in accordance with a relationship, which makes continuous walking possible by following the change in the target leg tip motion. For example, a torso motion that causes an actual ZMP to coincide with a target ZMP follows the change in the target leg tip motion.

The walking control method of the present invention comprises a step for detecting an actual torso motion, and a step for calculating a deviation of the actual torso motion from the target torso motion. It also implements a step for determining a correction quantity from the calculated deviation based on a prescribed transfer function, for correcting the stored torso gait data based on the correction quantity, and for instructing the corrected torso gait data to a joint angles computation device of the robot. The robot is provided with the device for calculating each joint angle of joints that the robot comprises.

In the above-mentioned legged robot and walking control method thereof, the actual torso motion of the robot is monitored, and the correction quantity of the torso gait data describing the target torso motion is determined from the deviation from the target torso motion. The torso motion is stabilized because the torso motion is directly controlled by feedback. The robot can continue walking stably without losing its balance.

Tests have shown that the robot can walk continuously by monitoring actual torso motion and providing feedback control, without measuring actual ZMP position and providing feedback control thereof. It was confirmed that continuous walking was possible even under the influence of a disturbance force.

According to this control technique, there is no need to measure the actual ZMP position, and a force sensor for measuring the actual ZMP position is not necessary. A highly reliable walking robot can be realized at a low cost.

It is desirable that the deviation calculation means calculate a deviation of an actual torso acceleration from a target torso acceleration. In this case, magnitude of an unanticipated disturbance force affecting the robot can be computed from the acceleration deviation. Accordingly, it becomes possible to compute the target torso motion correction quantity required to manifest in the robot enough force to compensate for the disturbance force. In the correction quantity calculation process, the correction quantity is determined based on the disturbance force computed from the acceleration deviation and the prescribed transfer function.

When the target torso motion corrected by the computed correction quantity is instructed to the robot, the robot is able to continue walking by compensating for the affects of the disturbance force. Since it is relatively easy to mount an acceleration sensor on the torso, this system is extremely realistic.

When computing a target torso position correction quantity from the acceleration deviation using the transfer function, it is desirable for the transfer function to comprise a proportional element. In this case, when an actual torso position deviates from a target torso position, a correction quantity proportional to this deviation is computed, with the result that a phenomenon, which uses springs to pull the robot toward the target torso position, is achieved.

In addition to the proportional element, it is also desirable that the transfer function comprise either a first-order lag element, or a second-order lag element, or both of these. In this case, when an actual torso position deviates from a target torso position, the correction quantity proportional to the rate and/or acceleration of the position deviation is computed, with the result that a phenomenon, which converges the robot on the target torso position, is achieved.

When the actual torso position can be detected, it is desirable that the target torso position is further corrected by adding a quantity that is a result of feedback-processing of a deviation of the actual torso position from the target torso position that has been corrected based on the acceleration deviation.

In this case, even if the robot is walking over rough terrain and the robot's entire body is tilted, the actual torso position can be feedback-controlled to the target torso position, enabling the robot to walk stably over rough terrain via a simple mechanism.

According to the invention, it is possible to realize a legged robot that continues walking stably without using force sensors in its leg tips. A highly reliable legged robot can be achieved inexpensively.

BRIEF DESCRIPTION OF THE DRAWINGS

It should be possible to better understand the present invention by referring to the figures below. The components of the figures are not necessarily represented at a fixed scale, and instead, highlighting is utilized to clarify the principles of the present invention. Reference numerals are used in the figures to show the parts that correspond to one another in the different figures.

BEST MODE FOR CARRYING OUT THE INVENTION

Figure 1:
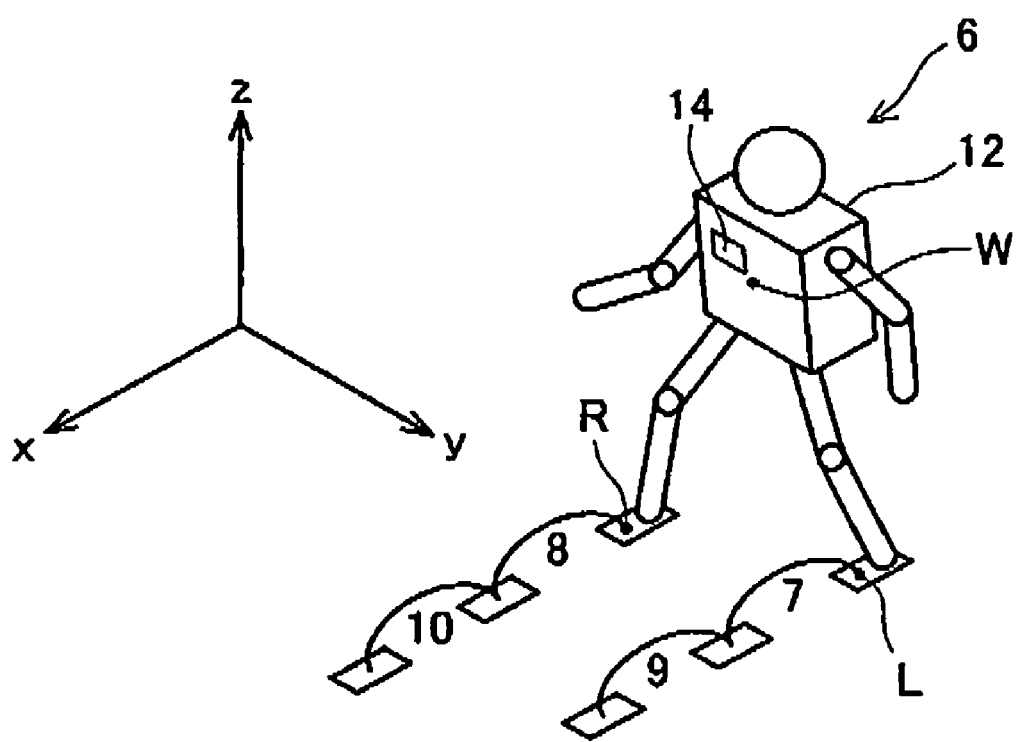
FIG. 1 is a diagram showing an overview of a legged mobile robot walking.

The present invention will be explained in even more detail below using embodiments, but the intention is not to limit the embodiments related to the present invention to those shown.

First Embodiment

The robot 6 shown in FIG. 1 moves the left leg as the floating leg along a trajectory 7 while the right leg is planted on the ground, and then, when the left leg is planted on the ground, moves the right leg as the floating leg along a trajectory 8, and similarly thereafter continues walling by moving the left leg as the floating leg along a trajectory 9, and subsequently moving the right leg as the floating leg along a trajectory 10.

In order for the robot 6 to continue walking, gait data is required, which is constituted from leg tip trajectory data describing the trajectories 7, 8, 9, 10 of the leg tip reference points L, R, hand trajectory data, and torso trajectory data describing the trajectory of a reference point W on the torso 12. Leg tip trajectory data is specified by an operator. Hand trajectory data is computed corresponding to the leg tip trajectory data. Torso trajectory data is set to a relationship in which a ZMP trajectory computed using a robot dynamic model coincides with a target ZMP trajectory.

To control the walking of the robot 6, a computer 14 is mounted on the torso 12 of the robot 6. The computer 14 has a CPU, ROM, RAM, hard disk, and so forth. The hardware configuration of the computer 14 is the same as that of an ordinary computer, and an explanation will be omitted. The computer 14 stores gait data, and controls the joints of the robot 6 on the basis thereof.

In this embodiment, as shown in FIG. 1, the walking direction of the robot 6 is treated as the x axis, the lateral direction is treated as the y axis, and the height direction is treated as the z axis.

Figure 2:
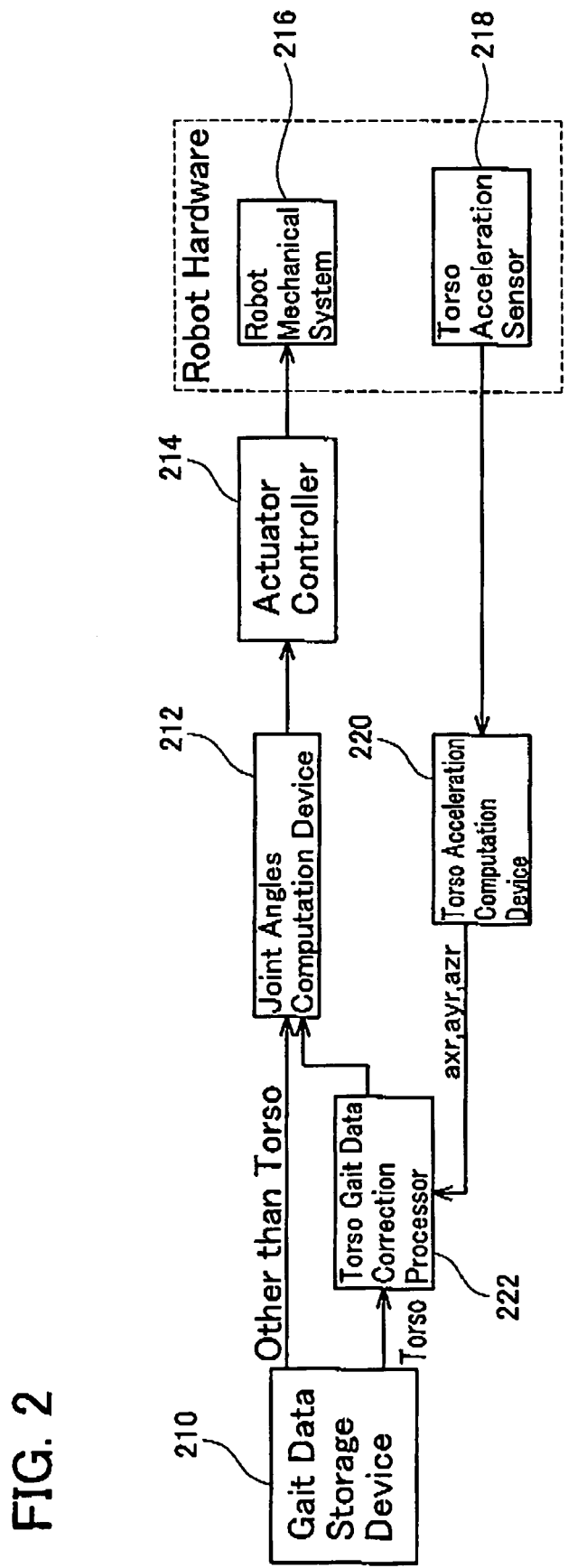
FIG. 2 is a block diagram showing the functionality of a computer of a first embodiment.

FIG. 2 is a block diagram showing the functionality of the computer 14. Of the elements shown in FIG. 2, the parts other than the robot mechanical system 216 and torso acceleration sensor 218 are the components of the computer 14. The computer 14 can either be physically comprised in its entirety as a single apparatus, or it can be divided and housed as physically separate devices.

Gait data of robot 6 computed beforehand is stored in a gait data storage device 210. Gait data refers to band trajectory data (hand gait data), leg tip trajectory data (leg tip gait data) and torso trajectory data (torso gait data). Of the gait data that is stored in advance, the hand trajectory data and the leg tip trajectory data are inputted directly to a joint angles computation device 212. The torso gait data is inputted to a torso gait data correction processor 222, the torso trajectory is corrected to that extent in line with the walking of the robot 6, and data indicating the corrected torso trajectory is inputted to the joint angles computation device 212.

The joint angles computation device 212 computes the respective joint angles $\theta 1$ (t), $\theta 2$ (t), $\theta 3$ (t), . . . of the robot 6 by solving for the so-called inverse kinematics, based on the inputted gait data. The computed joint angles data is inputted to an actuator controller 214.

The actuator controller 214 controls the actuators, which rotates the joints of the robot 6 of FIG. 1. The actuators exists in the robot mechanical system 216. When control is applied to the actuators, the joint angles of the robot 6 can be adjusted to computed joint angles. The robot 6 walks in accordance with the gait data.

The torso acceleration sensor 218 is mounted on the torso 12, and detects acceleration of the torso in the x direction (walking direction), y direction (lateral direction) and z direction (height direction). A torso acceleration computation device 220 outputs the actual torso accelerations axr, ayr, azr detected by the torso acceleration sensor 218 to the torso gait data correction processor 222.

The torso gait data correction processor 222 corrects the torso trajectory data based on the torso trajectory data (torso gait data) that is stored in the gait data storage device 210 and the actual torso acceleration of the robot computed by the torso acceleration computation device 220. A detailed explanation of the correction of the torso trajectory data will be provided below. The corrected torso trajectory data is inputted to the joint angles computation device 212.

Figure 3:
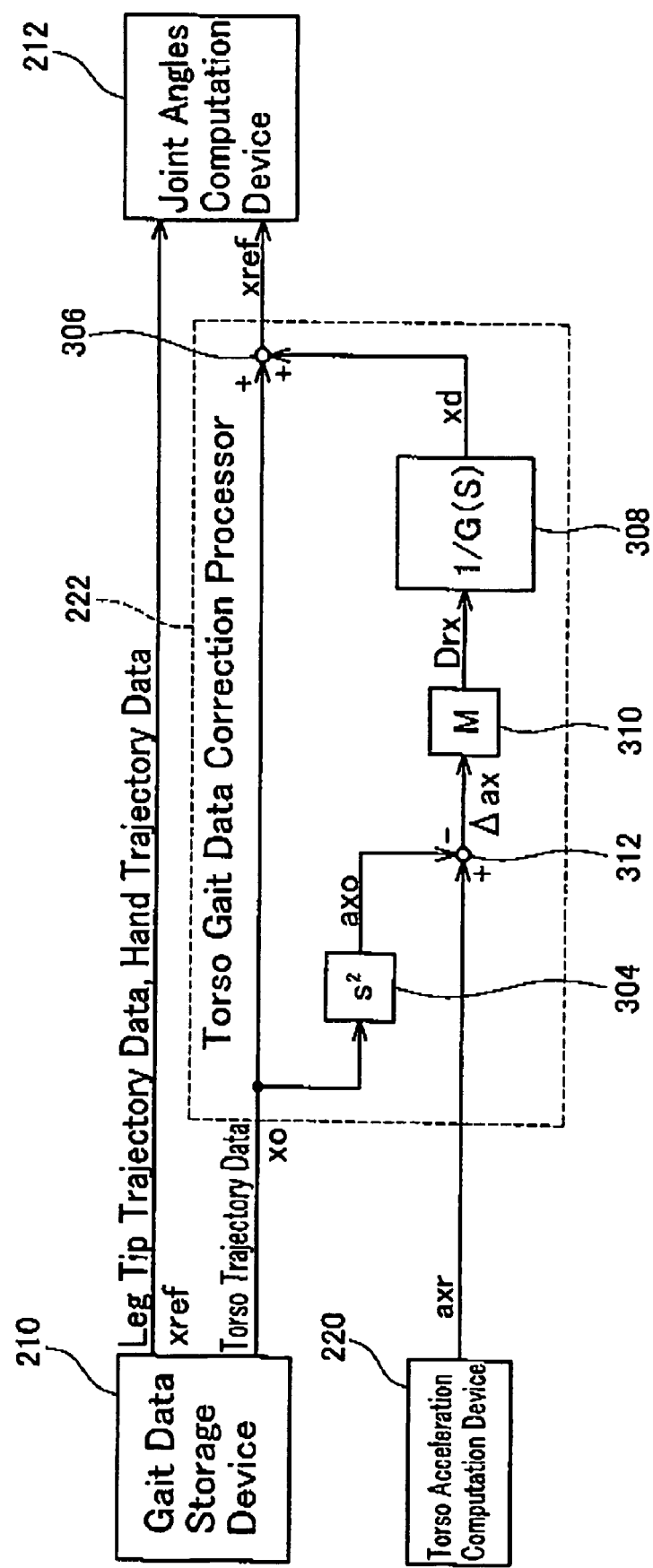
FIG. 3 is a block diagram showing the functionality of a torso gait data correction processor of the first embodiment.

FIG. 3 is a block diagram showing the details of the torso gait data correction processor 222. In FIG. 3, only events in the x direction are shown to make the figure more intelligible. Events in the y direction and z direction are similar. The leg tip trajectory data and hand trajectory data are directly instructed to the joint angles computation device 212 without being corrected.

In the torso gait data correction processor 222, target torso positions xo, yo, zo (each of which change over time), which are indicated in the torso gait data stored in the gait data storage device 210, are used to calculate target torso accelerations axo, ayo, azo in accordance with a device 304, which performs second order differential operations related to time.

In a deviation processing device 312, acceleration deviations $\Delta ax$, $\Delta ay$, $\Delta az$ are calculated by subtracting the target torso accelerations axo, ayo, azo from the actual torso accelerations axr, ayr, azr.

A disturbance force calculation device 310 calculates the magnitudes of a disturbance force Drx, Dry, Drz, which is estimated to act upon the robot, by multiplying the calculated acceleration deviations $\Delta ax$, $\Delta ay$, $\Delta az$ by the mass M of the robot. If there is backlash in the joints of the robot, a delay in response to control, or an external force that is applied from the outside, the acceleration deviations $\Delta ax$, $\Delta ay$, $\Delta az$ will occur due to an unanticipated disturbance force without the actual torso acceleration becoming the target torso acceleration. The magnitudes of the disturbance force Drx, Dry, Drz acting on the robot can be calculated from the acceleration deviations $\Delta ax$, $\Delta ay$, $\Delta az$.

A target correction quantity calculation device 308 inputs the calculated disturbance force Drx, Dry, Drz, and determines the correction quantities xd, yd, zd of the target torso position based on a transfer function 1/G(s). The transfer function 1/G(s) comprises lag elements, which comprise a second-order term coefficient as Mi, a first-order term coefficient as Ci, and a zero-order term coefficient as Ki, Mi, Ci, Ki are desired parameters, and are specified in advance. The processing of the target correction quantity calculation device 308 with regard to the x direction, for example, is equivalent to determining xd by solving for the differential equation:

$$Drx = Mi \cdot xd(2) + Ci \cdot xd(1) + Ki \cdot xd(0)$$

Here, (2) indicates a time-related second order differential, (1) indicates a time-related first order differential, and (0) indicates xd itself.

Furthermore, according to how the sign of the correction quantity xd is interpreted, it is also correct to express this equation as:

$$-Drx = Mi \cdot xd(2) + Ci \cdot xd(1) + Ki \cdot xd(0)$$

A target torso position correction device 306 adds the correction quantities xd, yd, zd to pre-correction target torso positions xo, yo, zo stored in the gait data storage device 210, calculates post-correction target torso positions xref, yref, zref, and instructs them to the joint angles computation device 212.

An effect provided by control laws for correcting the above-mentioned target torso trajectory data will be explained.

Figure 4:
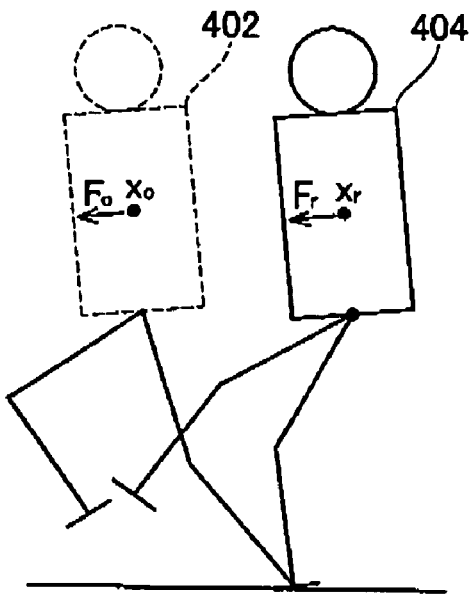
FIG. 4 is a diagram showing a dynamic model of a torso.

FIG. 4 shows a dynamic model of the robot. The torso 12 in the target torso position is indicated by 402, and the torso deviated from the target torso position is indicated by 404.

Formula (1) in FIG. 4 shows a general robot motion equation. F indicates the total external forces acting on the torso, M indicates the mass of the torso, and "a" indicates the acceleration of the torso.

There is an appropriate ideal trajectory (target trajectory) for walking for the torso. The target trajectory is the torso trajectory, which realizes a ZMP that coincides with a target ZMP as long as the robot is not influenced by a disturbance force.

Formula (2) shows the motion equation of the torso 402 of the robot, which moves in accordance with the target torso trajectory. Fo indicates the total external forces acting on the torso 402, and ao indicates the target acceleration of the torso 402.

Fo is the total external forces acting on the torso 402 when moving along the target torso trajectory, and is the resultant force of the internal force acting on the torso from leg links in a state wherein the robot is walking ideally and the gravitational force acting on the torso of the robot.

The actual torso motion is difficult to control in accordance with the target torso trajectory because it is affected by a disturbance force, such as an unexpectedly rough ground surface, or the structural bending of the robot. The actual torso motion is called the actual trajectory.

Formula (3) shows the motion equation of the torso 404 of the robot moving along the actual trajectory. Fr indicates the total external forces acting on the torso 404, and ar indicates the actual acceleration of the torso 404.

Formula (4) shows an estimating formula of the disturbance force, which acts on the torso of the robot Dr indicates the disturbance force, which expresses the influence of the disturbance force acting on the robot on the motion of the torso as an external force acting on the center of gravity of the torso. Fo is the total external forces acting on the torso when moving along the target torso trajectory, and is the resultant force of the internal force acting on the torso from the leg links in a state wherein the robot is walking ideally and the gravitational force acting on the torso of the robot. Fr is the total external forces influencing the torso moving along the actual trajectory, and is the resultant force of the internal force acting on the torso from the leg links in a state wherein the robot is walking ideally, the gravitational force and the disturbance force acting on the torso of the robot. Therefore, by finding the difference between Fr and Fo, it is possible to estimate the disturbance force Dr acting on the torso.

Formulas (5) and (6) show formulas for calculating the target torso position correction quantity xd utilized in the embodiment. The transfer function G(s) is described as the "mass—spring—damper system" shown in FIG. 5.

Figure 5:
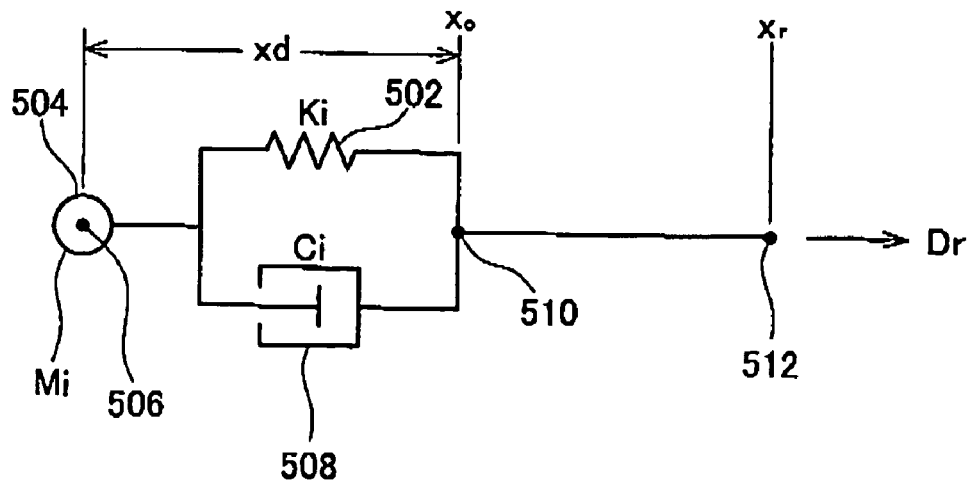
FIG. 5 is a diagram schematically showing a restoring force to an ideal trajectory acting on a torso.

FIG. 5 is a schematic diagram showing a relationship in which a force for returning to the ideal trajectory is applied to the torso of the robot by correcting the target torso position.

The pre-correction target torso position 510 is the ideal torso position for realizing a ZMP that coincides with the target ZMP.

In actuality, the actual torso position 512 deviates from the target torso position 510 due to the influence of the disturbance force Dr.

The post-correction target torso position 506 is a point separated by xd from the pre-correction target torso position 510.

If the target torso position is corrected using formula (6), the post-correction target torso position 506 and the pre-correction target torso position 510 arc linked by way of the spring 502 of the spring constant Ki and the damper 508 of the damping coefficient Ci, and the post-correction target torso position 506 has the mass point 504 of mass Mi, constituting the equivalence "mass—spring—damper system" in which the disturbance force Dr is acting on the actual torso position 512. The transfer function 1 /G(s) of "mass—spring—damper system" comprises the lag elements, which are indicated by the second-order term coefficient Mi, the first-order term coefficient Ci, and the zero order term coefficient Ki, and, in addition to exhibiting a restoring force to the target torso position against the disturbance force fluctuating wildly, also serves as a shock absorber to suppress a sudden position fluctuation.

The zero-order coefficient Ki introduces a target torso position correction quantity proportional to the disturbance force Dr. The first-order coefficient Ci introduces a target torso position correction quantity proportional to the first-order lag element of the disturbance force Dr. The second-order coefficient Mi introduces a target torso position correction quantity proportional to the second-order lag element of the disturbance force Dr.

Of these, the proportional element of coefficient Ki is essential, but either one or both of the first-order lag element of coefficient Ci and the second-order lag element of coefficient Mi can be omitted. It has been confirmed that the robot can continue to walk stably even if either one or both of the first-order lag element of coefficient Ci and the second-order lag element of coefficient Mi constitute zero.

Figure 6:
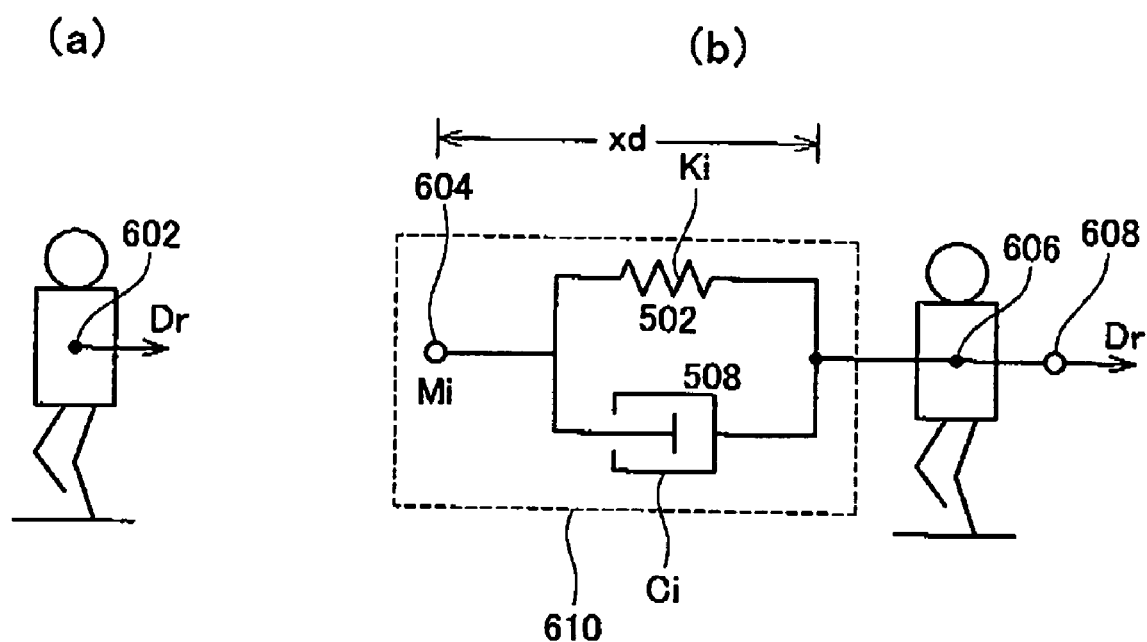
FIG. 6(a) and FIG. 6(b) are diagrams schematically showing the effect of correction of the target torso motion on the motion of a torso.

FIG. 6 schematically shows the effect of correcting the target torso motion.

FIG. 6(a) shows a state, wherein the target torso motion correction has not been performed for the walking robot. When the disturbance force Dr acts on the torso, the torso position 602 of the robot moved away from the ideal trajectory in accordance with the disturbance force Dr. When the disturbance force changes wildly, the actual torso motion changes wildly to make walking unstable.

FIG. 6(b) shows a state, wherein the target torso motion correction has been performed for the walking robot. When the disturbance force Dr acts on the torso, the target torso position is corrected by xd to the opposite side of the direction in which the disturbance force Dr is acting. The result of this is the generation of a force equivalent to that which moved the mass point of mass Mi to the opposite side at acceleration xd (2). The force acts on the robot is equivalent to that when the mass point of mass Mi was linked to the robot via the spring 502 of the spring constant Ki and the damper 508 of the damping coefficient Ci and the mass point of mass Mi was separated from the robot by the distance xd. This force compensates for the disturbance force Dr. The torso position of the robot returns toward the target torso position. When the torso position of the robot nears the pre-correction target torso position, the correction quantity xd becomes smaller. The actual torso position of the robot returns to the pre-correction target torso position in accordance with the correction of the target torso position.

Viewed from the standpoint of the dynamic characteristics of the robot, this is equivalent to compensating for the disturbance force Dr via a lag element 610, and maintaining the robot in the proximity of the target position 606 using a spring and a shock absorber.

As is clear from the equivalent dynamic system, a sudden fluctuation is removed from the control for compensating for the disturbance force in accordance with the control technology of this embodiment, making it possible to cope with a disturbance using actuators of limited capabilities. The robot is able to follow the target torso trajectory without sudden fluctuations. It is possible to actually confirm through testing that the torso of the robot is stable during walking. An observer can observe the state of robot walking worry free.

Figure 7:
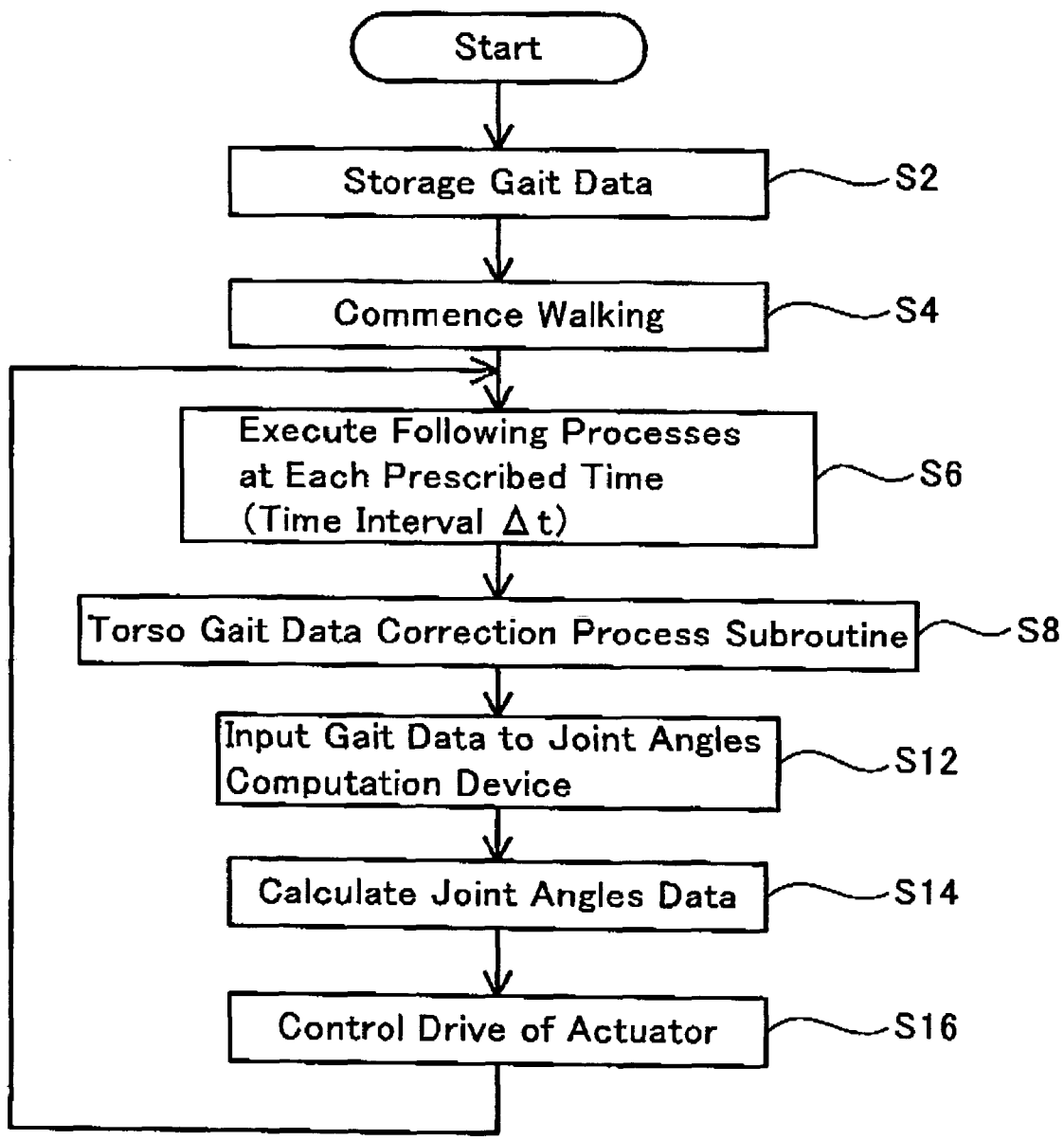
FIG. 7 is a diagram showing the processing sequence of a walking control method of the robot of the first embodiment.

FIG. 7 shows the processing sequence of a walking control method for the robot 6.

In Step S2, gait data, which describes time-series changes in target leg tip, hand and torso positions, is stored in the gait data storage device 210.

In Step S4, the robot commences walking. Once walking commences, the robot 6 repeatedly carries out Steps S8 and beyond. That is, the processing from Step S8 through Step S16 is repeatedly executed at each prescribed time (Δt).

In Step S8, data describing the target torso motion (torso gait data) is corrected based on the difference between the target torso motion and the actual torso motion such that robot walking becomes stable. Details of the processing carried out in Step S8 will be explained hereinbelow.

In Step S12, the leg tip trajectory data and hand trajectory data stored in the gait data storage device 210, and the torso trajectory data corrected in Step S8 are inputted to the joint angles computation device 214.

In Step S14, the joint angles of the respective joints of the robot 6 are computed by the joint angles computation device 212 based on the inputted gait data. The computed joint angles data is instructed to the actuator controller 214 of the robot The actuator controller 214 controls the actuators for rotating the respective joints of the robot 6. In accordance with this, joint angles of the robot 6 are adjusted to computed values.

As already described, the processing of Step S8 through Step S16 is repeatedly executed at each prescribed time (time interval Δt) (Step S6).

Figure 8:
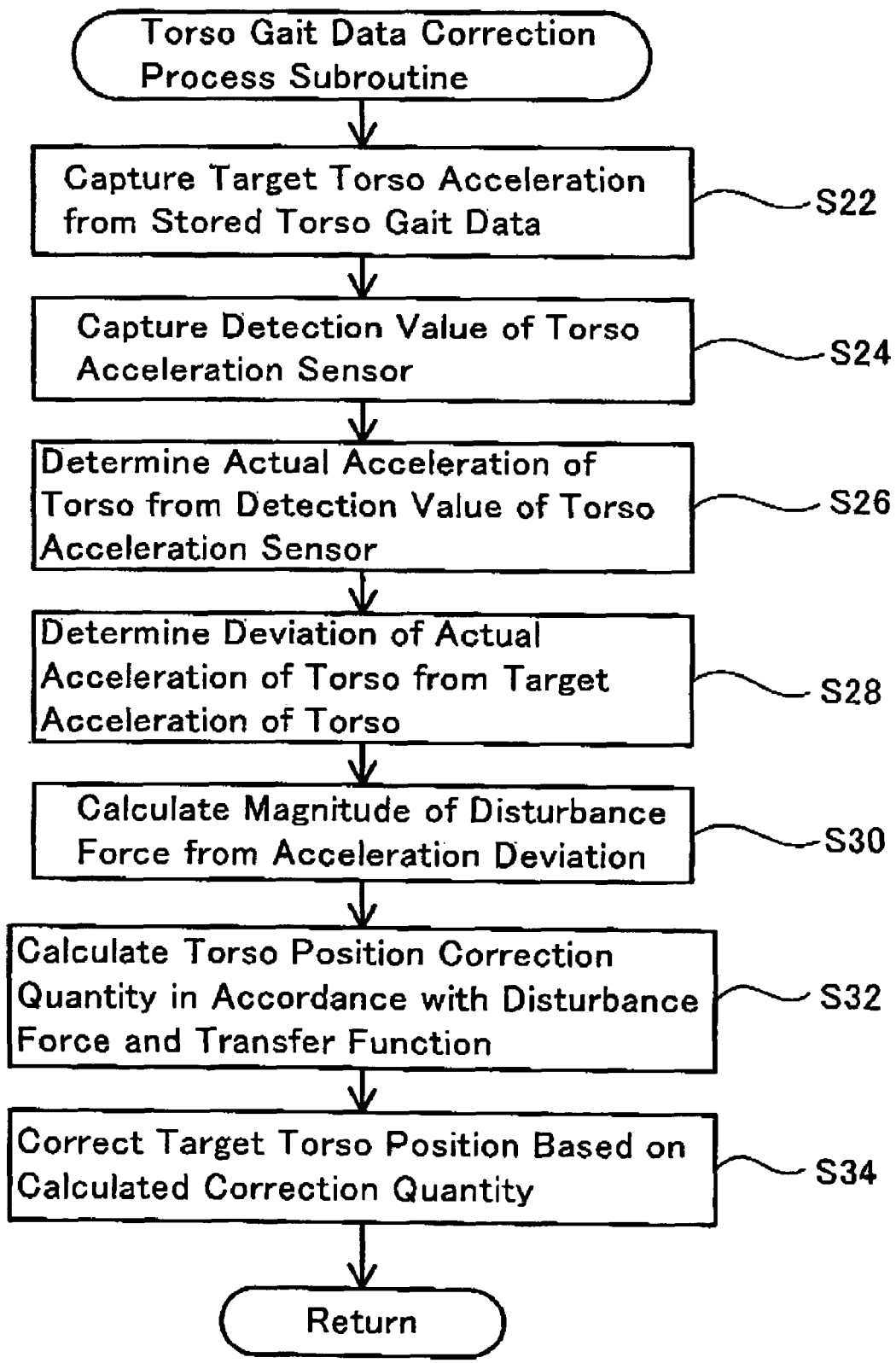
FIG. 8 is a diagram showing the processing sequence of a torso gait data correction process of the first embodiment.

FIG. 8 shows in detail the processing sequence of the torso gait data correction process of Step S8.

In Step S22, the target torso acceleration is calculated from the torso gait data stored in the gait data storage device 210.

In Step S24, a detection value of the torso acceleration sensor 218 is captured.

In Step S26, the actual torso acceleration is determined from the detection value of the torso acceleration sensor 218 by the torso acceleration computation device 220.

In Step S28, the deviation of the actual torso acceleration from the target torso acceleration is determined by the deviation processing device 312.

In Step S30, the magnitude of the disturbance force Dr causing the acceleration deviation is determined from the calculated acceleration deviation by the disturbance force calculation device 310.

In Step S32, the torso position correction quantity is calculated based on the magnitude of the disturbance force Dr and the transfer function 1/G(s) by the target correction quantity calculation device 308.

In Step S34, the torso position correction quantity is added to the pre-correction target torso position stored in the gait data storage device 210, and the post-correction target torso position is calculated and instructed to the joint angles computation device 212 by the target torso position correction device 306.

A portion or an entire computer 14 can also be mounted to the outside of the robot. For example, the gait data storage device 210 and the torso gait data correction processor 222 can be installed on the outside of the robot. In this case, the actual torso acceleration detected by the robot is sent to the torso gait data correction processor 222 via a wireless or wired signal, and the corrected gait data is sent to the robot via a wireless or wired signal. The joint angles computation device 212 can also be mounted to the outside of the robot. The computed joint angles data is transferred to the actuator controller 214 via either a wired or a wireless signal.

The walking robot of this embodiment continues walking by stabilizing the torso against disturbance forces without having force sensors in its leg tip.

In the above explanation, it is supposed that the tilt angle of the torso changes in accordance with a scheduled change pattern. The torso gait data only comprises data related to the torso position that makes an actual ZMP coincide with a target ZMP when the tilt angle of the torso changes in accordance with the scheduled change pattern. By contrast, "torso position and torso tilt angle" that make an actual ZMP coincide with a target ZMP can be calculated, and this, too, can be treated as the torso gait data.

There may be a scheduled change pattern for the torso tilt angle, or a calculated change pattern for the torso tilt angle. In both cases, data describing time-series change in the target torso tilt angle is provided. The torso tilt angle referred to here is the tilt angle around the x axis and the tilt angle around the y axis.

The technology of the present invention is valid not only for the torso position, but also for the torso angle. If the constitution is such that the deviation between a second order differential value related to the time of a target torso angle (angle acceleration) and the angle acceleration of the actual torso angle is calculated, and an angle proportional to this deviation, an angle proportional to a first order differential of the deviation, and an angle proportional to a second order differential of the deviation are calculated, and a target torso angle correction quantity is computed from these, it will be possible to compensate for the torso angle deviating from the target torso angle in accordance with the affect of the disturbance force. The present invention can generally be applied to the motions related to the position and posture of the torso, such as the torso position and the torso tilt angle.

Second Embodiment

A robot may be equipped with a device for detecting the torso position. For example, if a gyroscope is mounted on the robot, it is possible to detect not only the actual torso acceleration, but also the actual torso position. Mounting a GPS measurement sensor also makes it possible to detect the actual torso position. Torso velocity can be determined by integrating torso acceleration, and further integration will also make it possible to detect torso position.

When the robot can detect its actual torso position, a feedback control loop can be put to practical use. When the feedback control loop is utilized, it becomes possible to cope with a situation in which the robot is tilted in its entirety because the robot is walking over rough terrain. An explanation of the second embodiment will be given below, but only those points that differ from the first embodiment will be explained.

Figure 9:
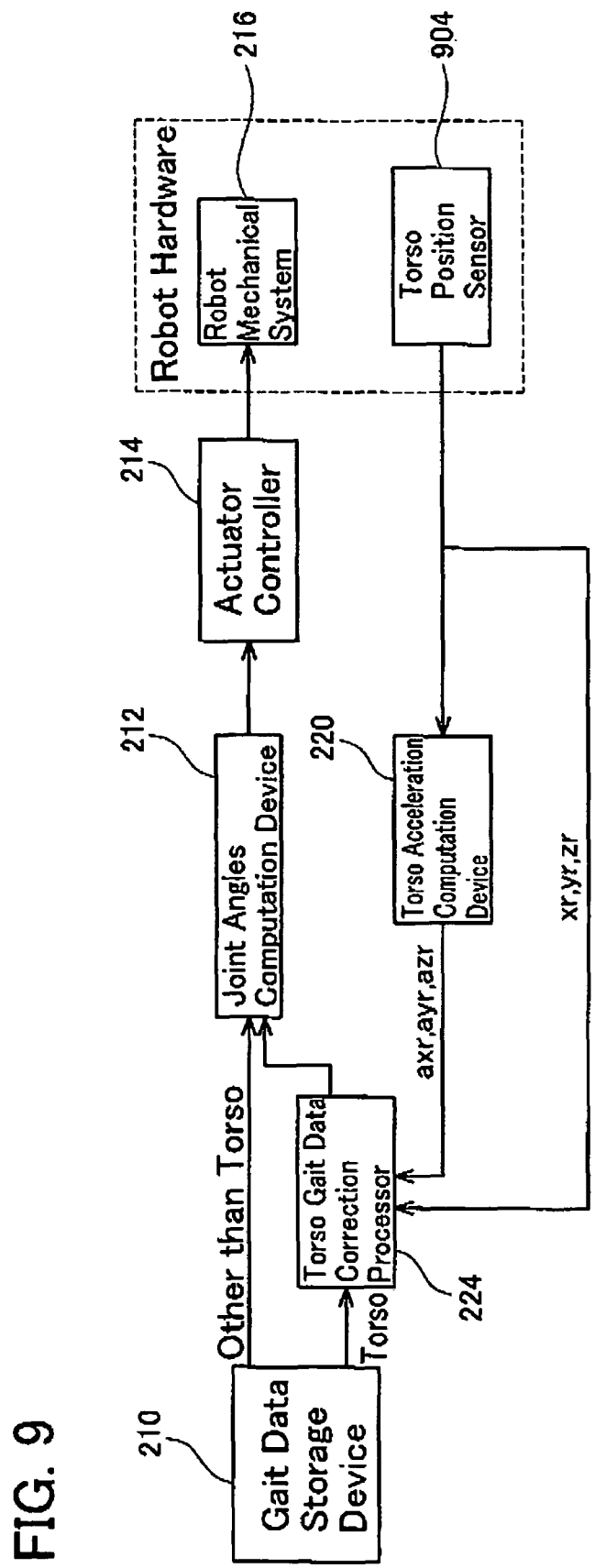
FIG. 9 is a block diagram showing the functionality of a computer of a second embodiment.

FIG. 9 shows a block diagram of the functionality of a computer of the robot of the second embodiment, and both the actual torso acceleration and actual torso position are inputted into the torso gait data correction processor 224.

Figure 10:
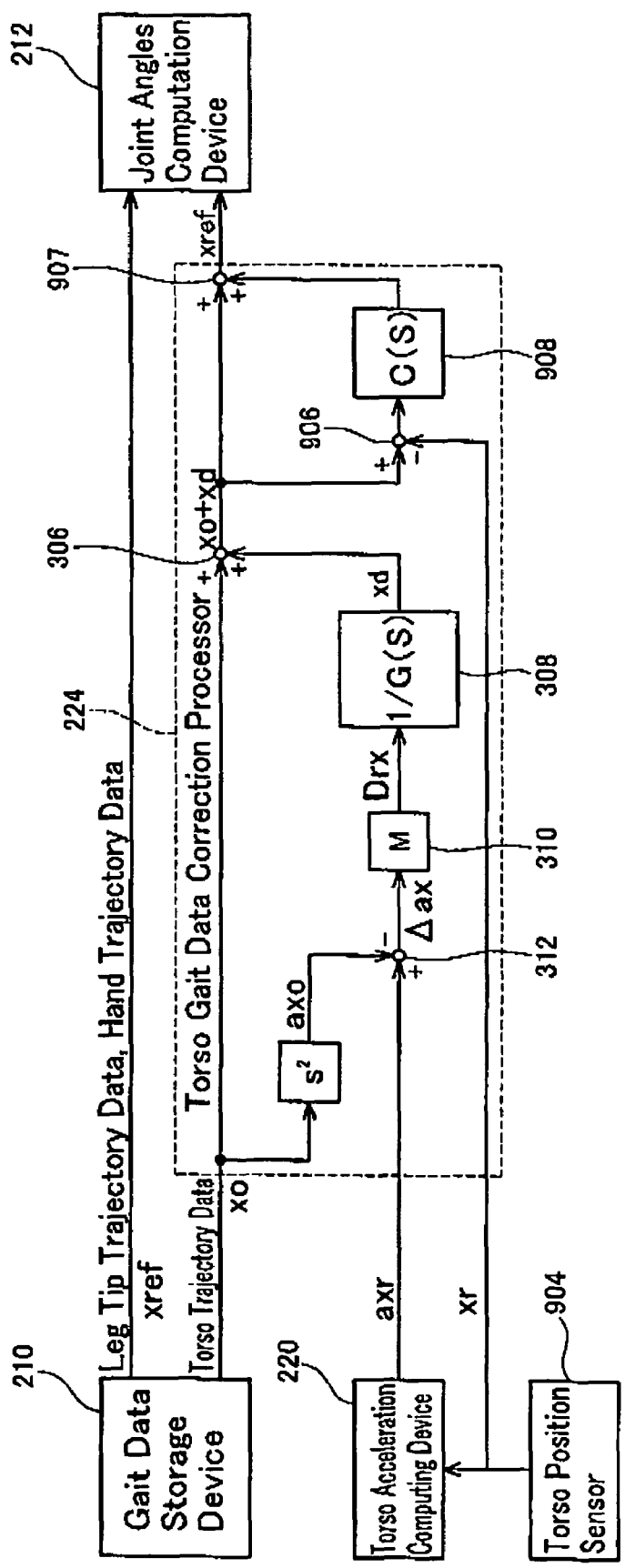
FIG. 10 is a block diagram showing the functionality of a torso gait data correction processor of the second embodiment.

FIG. 10 is a block diagram showing the details of the torso gait data correction processor 224. In FIG. 10, only events in the x direction are shown to make the figure more intelligible. Events in the y direction and z direction are similar.

Since a torso position sensor 904 is mounted on the robot, the actual torso position is measured. The torso acceleration computation device 220 performs second order differentiation for the actual torso position relative to time, and determines the actual torso acceleration. The same processing as the first embodiment is executed on the basis of the determined torso acceleration, and the correction quantity xd is computed based on the acceleration deviation.

A post-correction target torso position xo+xd, which is the result of the correction of the pre-correction target torso position xo using the correction quantity xd based on the acceleration deviation, is inputted to a deviation calculation device 906, and the deviation xo+xd−xr of the actual torso position xr is computed. The torso position deviation xo+xd−xr is inputted to a feedback processing block 908, and processed using a transfer function C(s). The target torso position xo+xd corrected using the correction quantity based on the acceleration deviation is further corrected by adding a value C(s) (xo+xd−xr), which was obtained by processing the deviation xo+xd−xr using the transfer function C(s). Ultimately, the corrected target torso position is corrected to xo+xd+C(s) (xo+xd−xr).

Figure 11:
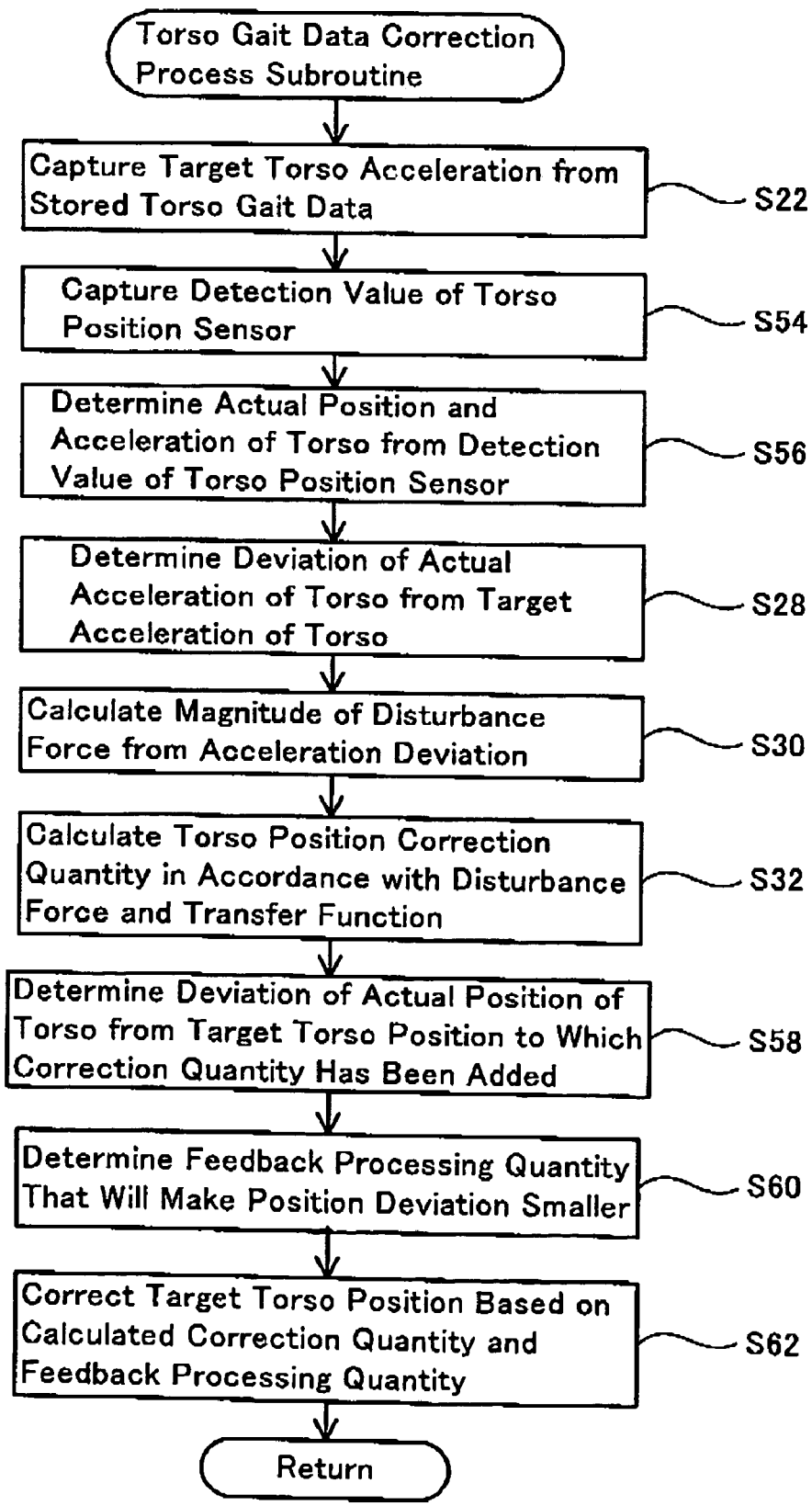
FIG. 11 is a diagram showing the processing sequence of a torso gait data correction process of the second embodiment.

FIG. 11 shows the processing sequence of the torso gait data correction process of the second embodiment.

In Step S54, a detection value of a torso position sensor 904 is captured.

In Step S56, an actual torso position and actual torso acceleration are detected from the detection value of the torso position sensor 904.

In Step S58, the post-correction target torso position xo+xd, which is the result of correction of the pre-correction target torso position xo using the correction quantity xd based on the acceleration deviation, and the deviation xo+xd−xr of the actual torso position xr are computed.

In Step S60, the transfer function C(s) is processed relative to the deviation, and the feedback process quantity C(s) (xo+xd−xr) is computed.

In Step S62, the target torso position xref to be instructed to the joint angles computation device is corrected to xo+xd+C(s) (xo+xd−xr).

Because the legged robot described in the second embodiment computes the deviation xo+xd−xr, and applies feedback control to the side of this deviation that becomes smaller, it is possible to implement feedback control for the target torso position even when the robot is walking on rough terrain, and the robot's entire body is inclined at an angle.

The torso position sensor can be a gyroscope for measuring the tilt angle of the torso. When the actual posture angle of the torso is determined by the gyroscope, it is possible to measure the torso position relative to the center of the sole of the leg tip planted on the ground by multiplying the distance R from the center of the sole of the planted leg tip to the center of gravity of the torso.

Detailed explanations of embodiments of the present invention have been given hereinabove, but these are nothing more than examples, and do not limit the scope of the claims. For example, embodiments, which describe time-series changes in terms of time and position in gait data, were introduced, but time-series changes in the motions of the leg tips, hands and torso can also be described in terms of time and acceleration, and time and velocity. The technology disclosed in the scope of the claims comprises aspects that modify and change the embodiments given as examples above in various ways.

In addition, the technological elements, which were explained in either this description or the figures, exhibit technical utility alone or in various combinations, and are not limited to the combinations disclosed in the claims originally attached to the request Further, the technology, which was illustrated in either this specification or the figures, simultaneously achieves a plurality of objects, and achieving any one of these objects has technical utility.

The invention claimed is:

1. A legged robot, comprising:
   a torso;
   a leg link, which is swingably connected to the torso;
   storing means for storing leg tip gait data describing a time-series change in a target leg tip motion;
   storing means for storing torso gait data describing a time-series change in a target torso motion, which enables walking following the change in the target leg tip motion;
   torso motion detection means for detecting an actual torso motion;
   deviation calculation means for calculating a deviation of the actual torso motion from the target torso motion; and
   correction means for determining a correction quantity from the calculated deviation based on a prescribed transfer function, and for correcting the torso gait data stored in the storing means for storing torso gait data based on the correction quantity.

2. The legged robot according to claim 1, wherein said deviation calculation means calculates a deviation of an actual torso acceleration from a target torso acceleration.

3. The legged robot according to claim 2, wherein said correction means determines the correction quantity based on a disturbance force that has been computed from the acceleration deviation and a prescribed transfer function.

4. The legged robot according to claim 3, wherein said transfer function comprises a proportional element.

5. The legged robot according to claim 4, wherein said transfer function comprises a first-order lag element and/or a second-order lag element.

6. The legged robot according to claim 3, wherein said correction means further corrects a target torso position by adding a quantity that is a result of feedback-processing of a deviation of an actual torso position from a target torso position that has been corrected based on the acceleration deviation.

7. The legged robot according to claim 4, wherein said correction means further corrects a target torso position by adding a quantity that is a result of feedback-processing of a deviation of an actual torso position from a target torso position that has been corrected based on the acceleration deviation.

8. The legged robot according to claim 5, wherein said correction means further corrects a target torso position by adding a quantity that is a result of feedback-processing of a deviation of an actual torso position from a target torso position that has been corrected based on the acceleration deviation.

9. A walking control method of a legged robot, comprising the steps of:
   storing leg tip gait data describing a time-series change in a target leg tip motion;
   storing torso gait data describing a time-series change in a target torso motion, which enables walking following the change in the target leg tip motion;
   detecting an actual torso motion;
   calculating a deviation of the actual torso motion from the target torso motion;
   determining a correction quantity from the calculated deviation based on a prescribed transfer function, and correcting the stored torso gait data based on the correction quantity; and
   instructing the corrected torso gait data to a joint angles computation device of the robot.

10. The walking control method of the legged robot according to claim 9, wherein said step of calculating the deviation calculates a deviation of an actual torso acceleration from a target torso acceleration, and said step of correcting determines the correction quantity based on a disturbance force calculated from the acceleration deviation and the prescribed transfer function.

11. The walking control method of the legged robot according to claim 10, wherein said step of correcting further corrects a target torso position by adding a quantity that is a result of feedback-processing of a deviation of an actual torso position from a target torso position that has been corrected based on the acceleration deviation.

* * * * *